United States Patent
Ratasuk et al.

(10) Patent No.: US 9,913,264 B2
(45) Date of Patent: Mar. 6, 2018

(54) COMPACT DOWNLINK CONTROL INFORMATION FOR MACHINE TYPE COMMUNICATIONS

(71) Applicant: Nokia Technologies Oy, Espoo (FI)

(72) Inventors: Rapeepat Ratasuk, Hoffman Estates, IL (US); Klaus Hugl, Vienna (AT); Frank Frederiksen, Klarup (DK)

(73) Assignee: Nokia Technologies Oy, Espoo (FI)

( * ) Notice: Subject to any disclaimer, the term of this patent is extended or adjusted under 35 U.S.C. 154(b) by 133 days.

(21) Appl. No.: 14/787,321

(22) PCT Filed: May 10, 2013

(86) PCT No.: PCT/IB2013/053818
§ 371 (c)(1),
(2) Date: Oct. 27, 2015

(87) PCT Pub. No.: WO2014/181156
PCT Pub. Date: Nov. 13, 2014

(65) Prior Publication Data
US 2016/0073381 A1 Mar. 10, 2016

(51) Int. Cl.
*H04W 72/04* (2009.01)
*H04W 4/00* (2018.01)

(52) U.S. Cl.
CPC ......... *H04W 72/042* (2013.01); *H04W 4/005* (2013.01)

(58) Field of Classification Search
None
See application file for complete search history.

(56) References Cited

U.S. PATENT DOCUMENTS

| 2011/0128922 A1* | 6/2011 | Chen | H04L 5/0007 |
| | | | 370/329 |
| 2011/0280164 A1* | 11/2011 | Luo | H04L 5/001 |
| | | | 370/281 |
| 2013/0265944 A1* | 10/2013 | Frenne | H04L 1/0031 |
| | | | 370/329 |

(Continued)

FOREIGN PATENT DOCUMENTS

WO 2013025145 A1 2/2013

OTHER PUBLICATIONS

International Search Report and Written Opinion received for corresponding Patent Cooperation Treaty Application No. PCT/IB2013/053818, dated Feb. 3, 2014, 11 pages.

(Continued)

*Primary Examiner* — Steven H Nguyen
(74) *Attorney, Agent, or Firm* — Harrington & Smith (57) ABSTRACT

A method for coverage enhancement is described. The method includes determining a DCI assignment for a communications device experiencing limited coverage. A DCI assignment includes a plurality of configuration fields. Selecting an indication of the DCI assignment is included in the method. The indication of the DCI assignment uses fewer resources than the DCI assignment. The method also includes sending the indication of the DCI assignment to the communications device. The communications device receives the indication of a DCI assignment. The method also includes determining, by the communications device, the DCI assignment for the communications device based at least in part on the indication of the DCI assignment.

20 Claims, 3 Drawing Sheets (56) References Cited

U.S. PATENT DOCUMENTS

2015/0043394 A1* 2/2015 Lin .................. H04L 1/1861
370/280

OTHER PUBLICATIONS

LG Electronics: "Discussion on Coverage enhancement for a low-cost MTC UE", 3GPP TSG RAN WG1#71; R1-124993; 3rd Generation Partnership Project, Mobile Competence Centre, 6 pages.

"3rd Generation Partnership Project; Technical Specification Group Radio Access Network; Evolved Universal Terrestrial Radio Access (E-UTRA); Multiplexing and channel coding(Release 11)", 3GPP TS 36.212, V11.2.0, Feb. 2013, pp. 1-82.

"New WI: Low Cost & Enhanced Coverage MTC UE for LTE", 3GPP TSG-RAN meeting #60, RP-130848, Agenda: 13.1.3, Vodafone, Jun. 10-14, 2013, 7 Pages.

"Proposed WID on Study on Enhancements for MTC (from S1-101236)", 3GPP TSG Services and System Aspects meeting #48, TSGS#48(10)0448, Agenda: 13.24, Jun. 7-10, 2010, 7 Pages.

Office action received for corresponding European Patent Application No. 13734177.2, dated Jan. 27, 2017, 3 pages.

"3rd Generation Partnership Project;Technical Specification Group Radio Access Network;Evolved Universal Terrestrial Radio Access (E-UTRA)and Evolved Universal Terrestrial Radio Access Network(E-UTRAN); Overall description;Stage 2 (Release 13)", 3GPP TS 36.300, V13.6.0, Dec. 2016, pp. 1-314.

"3rd Generation Partnership Project;Technical Specification Group Radio Access Network;Evolved Universal Terrestrial Radio Access (E-UTRA);Physical layer procedures (Release 13)", 3GPP TS 36.213, V13.5.0, Mar. 2017, pp. 1-387.

* cited by examiner

COMPACT DOWNLINK CONTROL INFORMATION FOR MACHINE TYPE COMMUNICATIONS

RELATED APPLICATION

This application was originally filed as Patent Cooperation Treaty Application No. PCT/IB2013/053818 filed May 10, 2013.

TECHNICAL FIELD

The exemplary and non-limiting embodiments relate generally to wireless communication systems, methods, devices and computer programs and, more specifically, relate to providing coverage enhancement for machine type communications (MTC).

BACKGROUND

This section is intended to provide a background or context. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

For example, in LTE Rel-12, coverage enhancement for machine type communications (MTC) may potentially extend the LTE coverage by approximately 20 dB beyond the typical range of LTE (such as defined as a cell-edge data rate of 20 kbps). The degree of coverage enhancement varies for different channels based on a link budget analysis. For the (E)PDCCH, the target coverage improvement is 14.6 dB for FDD (2Tx-2Rx) and 19.8 dB for TDD (8Tx-8Rx).

A typical approach to extending (E)PDCCH coverage is to use longer transmission time (such as using repetition or spreading for example) in order to allow the UE (mobile device) or eNB (base station) to correctly demodulate and decode the signal. To reach the target coverage improvement, a repetition factor of approximately 100 may use 8 control channel elements (CCEs) for LTE devices with 2 received antennas deployed in system bandwidth of 10 MHz (such as when the (E)PDCCH is transmitted over 100 ms). For low-cost MTC devices, which may have a reduced bandwidth capability (such as, 1.4 or 3 MHz), additional frequency diversity loss of 1-2 dB can be experienced. When a single receive RF chain is present, then a further 3-4 dB loss can be experienced. Thus, for low-cost MTC, a repetition factor in the order of 400-800 times may be needed for cell-edge UEs.

There is considerable overhead to support all these repetitions. For instance, using aggregation level 8 for PDCCH and 100 repetitions for 10 MHz, 800 CCEs will be taken by a single device for a single transmission. This may be seen as 400 missed scheduling opportunities (assuming an average CCE aggregation level of 2). This overhead may be significantly worse for low-cost MTC devices. Further, if a reduced bandwidth of 1.4 MHz is used and the device has only one receiver chain, then 3,200 CCEs may be taken up. This may be seen as 1600 missed scheduling opportunities or being able to only schedule one device in the downlink in 1 second.

What is needed are techniques to reduce the overhead while providing coverage enhancement for machine type communications.

SUMMARY

The below summary section is intended to be merely exemplary and non-limiting.

The foregoing and other problems are overcome, and other advantages are realized, by the use of the exemplary embodiments.

In a first aspect thereof an exemplary embodiment provides a method for coverage enhancement. The method includes determining a DCI assignment for a communications device experiencing limited coverage. The communications device may be suffering pathloss to the serving cell greater than a certain threshold and/or have SINR/SNR below a certain threshold. A DCI assignment includes a plurality of configuration fields. Selecting an indication of the DCI assignment is included in the method. The indication of the DCI assignment uses fewer resources than the DCI assignment (such as where the indication of the DCI assignment has fewer bits than a DCI assignment having all fields for the associated DCI format). The method also includes sending the indication of the DCI assignment to the communications device.

In another aspect thereof an exemplary embodiment provides a method for coverage enhancement. The method includes receiving an indication of a DCI assignment at a communications device. A DCI assignment includes a plurality of configuration fields and the indication of the DCI assignment is smaller than the DCI assignment. The method also includes determining the DCI assignment for the communications device based at least in part on the indication of the DCI assignment.

In a further aspect thereof an exemplary embodiment provides an apparatus for coverage enhancement. The apparatus includes at least one processor and at least one memory storing computer program code. The at least one memory and the computer program code are configured to, with the at least one processor, cause the apparatus to perform actions. The actions include determining a DCI assignment for a communications device experiencing limited coverage. The communications device may be suffering pathloss to the serving cell greater than a certain threshold and/or have SINR/SNR below a certain threshold. A DCI assignment includes a plurality of configuration fields. Selecting an indication of the DCI assignment is included in the actions. The indication of the DCI assignment uses fewer resources than the DCI assignment (such as where the indication of the DCI assignment has fewer bits than a DCI assignment having all fields for the associated DCI format). The actions also include sending the indication of the DCI assignment to the communications device.

In another aspect thereof an exemplary embodiment provides an apparatus for coverage enhancement. An exemplary embodiment provides an apparatus for coverage enhancement. The apparatus includes at least one processor and at least one memory storing computer program code. The at least one memory and the computer program code are configured to, with the at least one processor, cause the apparatus to perform actions. The actions include receiving an indication of a DCI assignment at a communications device. A DCI assignment includes a plurality of configuration fields and the indication of the DCI assignment is smaller than the DCI assignment. The actions also include determining the DCI assignment for the communications device based at least in part on the indication of the DCI assignment.

In a further aspect thereof an exemplary embodiment provides a computer readable medium for coverage enhancement. The computer readable medium is tangibly encoded with a computer program executable by a processor to perform actions. The actions include determining a DCI assignment for a communications device experiencing limited coverage. The communications device may be suffering pathloss to the serving cell greater than a certain threshold and/or have SINR/SNR below a certain threshold. A DCI assignment includes a plurality of configuration fields. Selecting an indication of the DCI assignment is included in the actions. The indication of the DCI assignment uses fewer resources than the DCI assignment (such as where the indication of the DCI assignment has fewer bits than a DCI assignment having all fields for the associated DCI format). The actions also include sending the indication of the DCI assignment to the communications device.

In another aspect thereof an exemplary embodiment provides a computer readable medium for coverage enhancement. The computer readable medium is tangibly encoded with a computer program executable by a processor to perform actions. The actions include receiving an indication of a DCI assignment at a communications device. A DCI assignment includes a plurality of configuration fields and the indication of the DCI assignment is smaller than the DCI assignment. The actions also include determining the DCI assignment for the communications device based at least in part on the indication of the DCI assignment.

In a further aspect thereof an exemplary embodiment provides an apparatus for coverage enhancement. The apparatus includes means for determining a DCI assignment for a communications device experiencing limited coverage. The communications device may be suffering pathloss to the serving cell greater than a certain threshold and/or have SINR/SNR below a certain threshold. A DCI assignment includes a plurality of configuration fields. Means for selecting an indication of the DCI assignment is included in the apparatus. The indication of the DCI assignment uses fewer resources than the DCI assignment (such as where the indication of the DCI assignment has fewer bits than a DCI assignment having all fields for the associated DCI format). The apparatus also includes means for sending the indication of the DCI assignment to the communications device.

In another aspect thereof an exemplary embodiment provides an apparatus for coverage enhancement. The apparatus includes means for receiving an indication of a DCI assignment at a communications device. A DCI assignment includes a plurality of configuration fields and the indication of the DCI assignment is smaller than the DCI assignment. The apparatus also includes means for determining the DCI assignment for the communications device based at least in part on the indication of the DCI assignment.

BRIEF DESCRIPTION OF THE DRAWINGS

The foregoing and other aspects of exemplary embodiments are made more evident in the following Detailed Description, when read in conjunction with the attached Drawing Figures, wherein.

DETAILED DESCRIPTION

In general, there are two approaches for ensuring a proper transmission/reception of a data packet. Either the number of resources used on the radio channel are increased (such as through repetition), or the amount of payload bits is reduced. To reduce the overhead significantly, a compact DCI format may be used. The reduced DCI size may be used for MTC devices in coverage-limited situations where a large number of repetitions may be used. This compact DCI format may be used to convey DL and UL scheduling assignments.

To reduce the overhead significantly, various exemplary embodiments provide for use of a compact DCI format. This compact DCI format may be reserved for use by MTC devices in poor coverage (such as those located near the cell edge, those with a signal to interference plus noise ratio (SINR) or a signal to noise ratio (SNR) below a predefined threshold, or those with pathloss to the serving cell greater than a predefined threshold, for example). The DCI size may be reduced using a preconfigured DCI and index assignment, using a preconfigured DCI triggered by a RNTI, using preconfigured or specified fields, using partial RNTI masking to reduce CRC size, and/or using an (E)PDCCH region extension.

As a non-limiting example, information about the expected traffic (for example amount of data to transmit, when data will be available, and delay budget or allowed transmission time) and expected channel conditions may be available to the network when the UE first connects to the system. The network can then preconfigure many of the fields in the scheduling assignment (such as, TBS, resource block allocation, MCS, power control, etc.) based on the a priori knowledge. In subsequent assignments, the network does not need to send this same information to the UE again. Thus, the contents of the DCI may be omitted when the UE is to use the preconfigured values.

Various exemplary embodiments provide a method, apparatus and computer program(s) to provide coverage enhancement for machine type communications (MTC).

Figure 1:
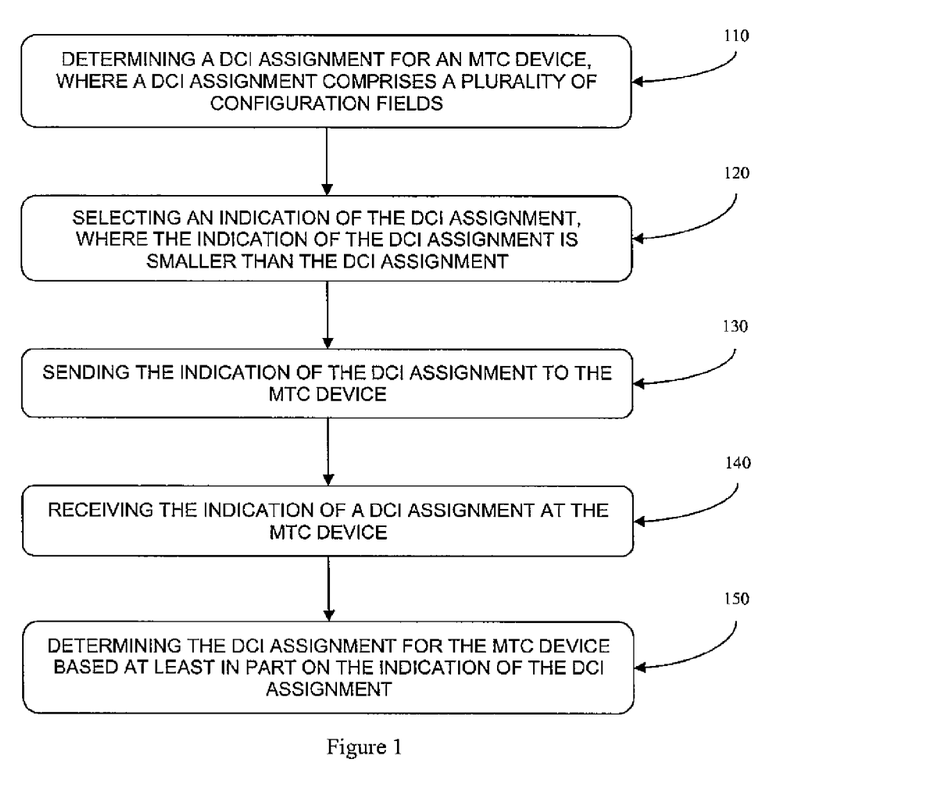
FIG. 1 is a logic flow diagram that illustrates the operation of an exemplary method, and a result of execution of computer program instructions embodied on a computer readable memory, in accordance with various exemplary embodiments.

FIG. 1 is a logic flow diagram that illustrates the operation of a method, and a result of execution of computer program instructions, in accordance with exemplary embodiments. In accordance with these exemplary embodiments a method performs, at Block 110, a step of determining a DCI assignment for an MTC device. A DCI assignment includes a plurality of configuration fields. At Block 120, the method performs a step of selecting an indication of the DCI assignment. The indication of the DCI assignment is smaller than the DCI assignment. The indication of the DCI assignment is sent to the MTC device at Block 130. At Block 140, the indication of a DCI assignment is received at the MTC device. The method performs, at Block 150, a step of determining the DCI assignment for the MTC device based at least in part on the indication of the DCI assignment.

The various blocks shown in FIG. 1 may be viewed as method steps, and/or as operations that result from operation of computer program code, and/or as a plurality of coupled logic circuit elements constructed to carry out the associated function(s).

Some compression on the DCI can be achieved based on various levels. In some cases, the DCI may not be needed. In such situations, when considering MTC UEs in extremely low coverage, a fast L1 HARQ feature may be disabled avoiding processing HARQ information for ID, RV and NDI. Similarly, power control commands may be disabled since MTC UEs in extremely low coverage may be transmitting at the maximum output power.

In other cases, limited granularity may be sufficient. As one non-limiting example, rough information on which resource block (RB) pairs are allocated may be used rather than a detailed RB map. This information may be conveyed using 2 bits to indicate whether PRBs in the full bandwidth (BW), upper half of the BW, or lower half of the BW are allocated. As additional non-limiting examples, the transport block size (TBS) may be communicated using 3 bits and/or the MCS may be preconfigured/fixed to the lowest level.

In another case, the information in the DCI may be restricted to new/updated information. A prior configuration (or a predefined configuration) may be sufficient for many DCI fields. In this situation, these fields may be omitted. As a non-limiting example, an indication of a time reference when the actual PDSCH/PUSCH grant is valid may be provided. This indication may be a reference to a frame number (such as when grants start at subframe #0). Rather than using a preconfigured time reference that "points" to fixed time instants (such as in a dynamic scheduling approach), a start at time may be identified. As a non-limiting example, the start time may be identified as "when frame modulo 4 is 1". Alternately, a superframe may be defined where PDCCH and PDSCH start at the beginning of the superframe.

In one exemplary embodiment, a number of DCI assignments may be preconfigured. These configurations may be UE-specific, cell-specific, system-specific, or specified in relevant specifications. Then, the index to the DCI assignment is signaled to the UE in the DCI. Since coverage-limited UEs may have restrictions for the scheduling assignment (such as to the lowest MCS level, limited to 1 or 2 RBs in the UL, limited maximum transmission power in the uplink, etc.), a limited number of configurations may be sufficient to support efficient MTC operation. For instance, if 16 configurations are supported then only 4 bits are needed for signaling which can reduce the DCI size substantially. In this example, the DCI size is reduced to 20 bits. While the DCI format may define a plurality of the fields (such as MCS, TBS, RV, resource block assignment, etc.), the index allows the eNB to communicate the contents for those fields without explicitly sending each field.

Additionally, there may be DCI assignments for different DCI formats where both the DCI format and the index may be provided to the UE. Alternatively, the index may indicate a DCI assignment having a given format (where different indices may indicate preconfigured DCI assignments having different formats).

In another exemplary embodiment, values in some fields of the DCI may be preconfigured (for example, the modulation and coding selection (MCS), the transport block size (TBS), the RB assignment, the HARQ process number, the redundancy version, the carrier indicator, the sounding reference signal (SRS) request, etc). As discussed above, coverage-limited UEs may be restricted in the scheduling assignment, so many of these DCI field values may be preconfigured. In addition, some fields such as the HARQ process number or the redundancy version may also have fixed values for MTC. These configurations may be UE-specific, cell-specific, system-specific, or specified in a specification. Accordingly, these fields may then be left out of the DCI, creating a compact DCI.

In a further exemplary embodiment, the downlink (DL) and uplink (UL) scheduling assignments for a UE may be preconfigured. These configurations may be UE-specific, cell-specific, system-specific, or specified in a specification. The RNTI is signaled in the DCI which is masked with information on whether there is a downlink or uplink assignment. A UE that decodes its own RNTI in the (E)PDCCH may then transmit or receive using the preconfigured scheduling assignments and a predefined timing relationship.

The RNTI may inform the UE that it is being scheduled based on a predefined timing relationship. The scheduling assignment may be preconfigured for this UE (such as, via RRC signaling or fixed in a specification). In semi-persistent scheduling (SPS), the scheduling assignment may be transmitted with the C-RNTI. The UE, then, periodically transmits/receives data without any further scheduling assignment. The scheduling assignment may indicate an expiration of the assignment.

In another exemplary embodiment, the DL and UL scheduling assignments for a UE may be preconfigured or pre-determined based on the UE's traffic pattern, service type, application, and/or known traffic. The network uses this prior knowledge of the UE's data transmission (such as, from a smart meter reporting 100 bytes every day), then the network can preconfigure the fields of the DCI that are appropriate for the expected data transmission and traffic.

In a further exemplary embodiment, the DL and UL scheduling assignments may be based on the UE's ID. The network may reserve certain IDs for certain types of services (such as a limited number of MAC IDs for example). Then, based on the UE's ID, the network can identify DCI fields which may be omitted when the values are in accordance with the associated type of service. Since the UE is aware of its ID, the UE can use its ID to determine the value for any omitted fields.

In another exemplary embodiment, a smaller CRC may be used (such as an 8 bit CRC instead of a 16 bit CRC). This allows partial masking of the RNTI, for example, by using the 8 lower bits from the RNTI to mask it. While this may reduce the number of UEs that can be supported, there may be enough supported UEs sufficient for MTC operation (such as when the UEs are time-controlled). Further, the use of the smaller CRC may be combined with RNTI verification when considering the CRC check applied to a data channel transmission (such as a PDSCH transmission).

In a further exemplary embodiment, the eNB may select the DCI format based on a PRACH transmission from the UE. As a non-limiting example, when a UE uses an extended PRACH (such as one with a long transmission time) to access the system, the eNB uses a compact DCI format to address it. The amount of (E)PDCCH repetition can also be implicitly determined based on the extended PRACH format. Likewise, the UE knows to expect a compact DCI format and repetition factor based on its use of an extended PRACH.

In another exemplary embodiment, the (E)PDCCH region is extended. When extreme repetition is used, much of the control resource may be taken up. This may reach an extent that there is not any more room for scheduling other UEs. Thus, the PDCCH can be extended to the full subframe or the EPDCCH can be extended to the full band. For the PDCCH, this would potentially give almost 4 times more resources, which results in 4 times less time for transmitting the same amount of energy.

Figure 2:
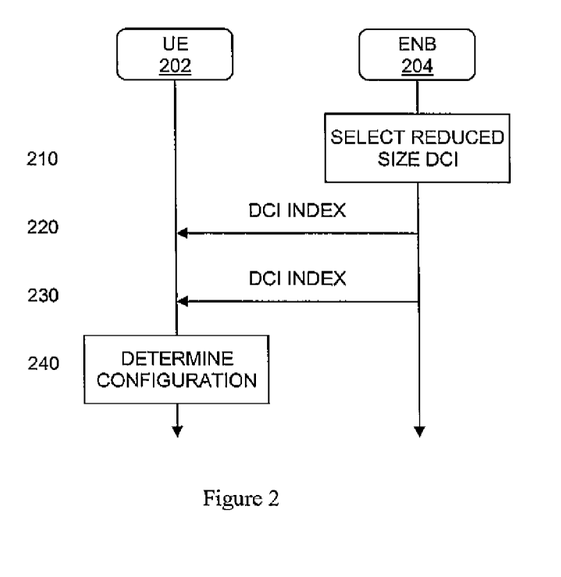
FIG. 2 is a signaling diagram that illustrates the operation of an exemplary method, and a result of execution of computer program instructions embodied on a computer readable memory, in accordance with various exemplary embodiments.

FIG. 2 is a signaling diagram that illustrates the operation of an exemplary method, and a result of execution of computer program instructions embodied on a computer readable memory, in accordance with various exemplary embodiments. As shown, an eNB 204 selects a reduced size DCI for the UE 202, such as by selecting an index for a predefined DCI assignment at time 210. The eNB 204 then sends the index for the predefined DCI assignment to the UE 202 at time 220 and then repeats the transmission at time 230 (additional repetitions may also occur). Once the UE 202 receives the index for the predefined DCI, the UE 202 uses the DCI index in order to determine the predefined DCI assignment at time 240.

Figure 3:
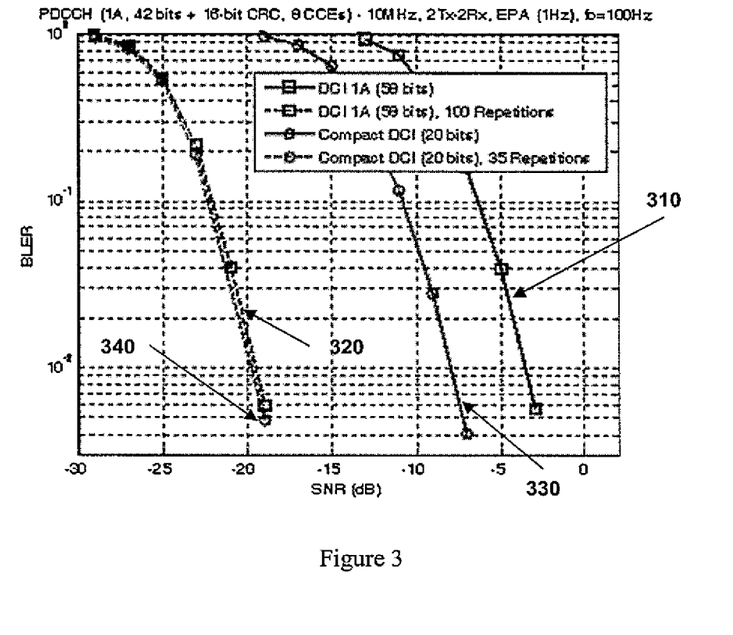
FIG. 3 illustrates a comparison of PDCCH (1A) performance with regular and compact DCI sizes in accordance with various exemplary embodiments.

FIG. 3 illustrates a comparison of PDCCH (1A) performance with regular and compact DCI sizes in accordance with various exemplary embodiments. FIG. 3 illustrates the performance of the PDCCH with either regular or compact DCI sizes. Based on the figure, when the DCI size is reduced from 58 (lines 310, 330) to 20 bits (lines 320, 340), then various gains may be realized. For cell edge UEs, a repetition factor of 35 (line 340) may be used instead of 100 (line 330), leading to overhead saving of 65%. For UEs in a signal-to-noise ratio (SNR) range of −8 to −3.6, no repetition is required. This can result in substantial saving because only a few repetition factors may be specified (such as, 4, 16, 32, 64, 128, etc.). Thus, when excess repetition can be prevented/avoided a significant saving in overhead may be had.

When the aggregation levels are coarse (such as 1, 2, 4, and 8), significant saving is possible if lower CCE aggregation level are to be used.

These gains allow more users to be scheduled and/or users are not blocked from being scheduled. As a result, system throughput may improve and latency can be reduced.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although not limited thereto. While various aspects of the exemplary embodiments may be illustrated and described as block diagrams, flow charts, or using some other pictorial representation, it is well understood that these blocks, apparatus, systems, techniques or methods described herein may be implemented in, as nonlimiting examples, hardware, software, firmware, special purpose circuits or logic, general purpose hardware or controller or other computing devices, or some combination thereof.

Figure 4:
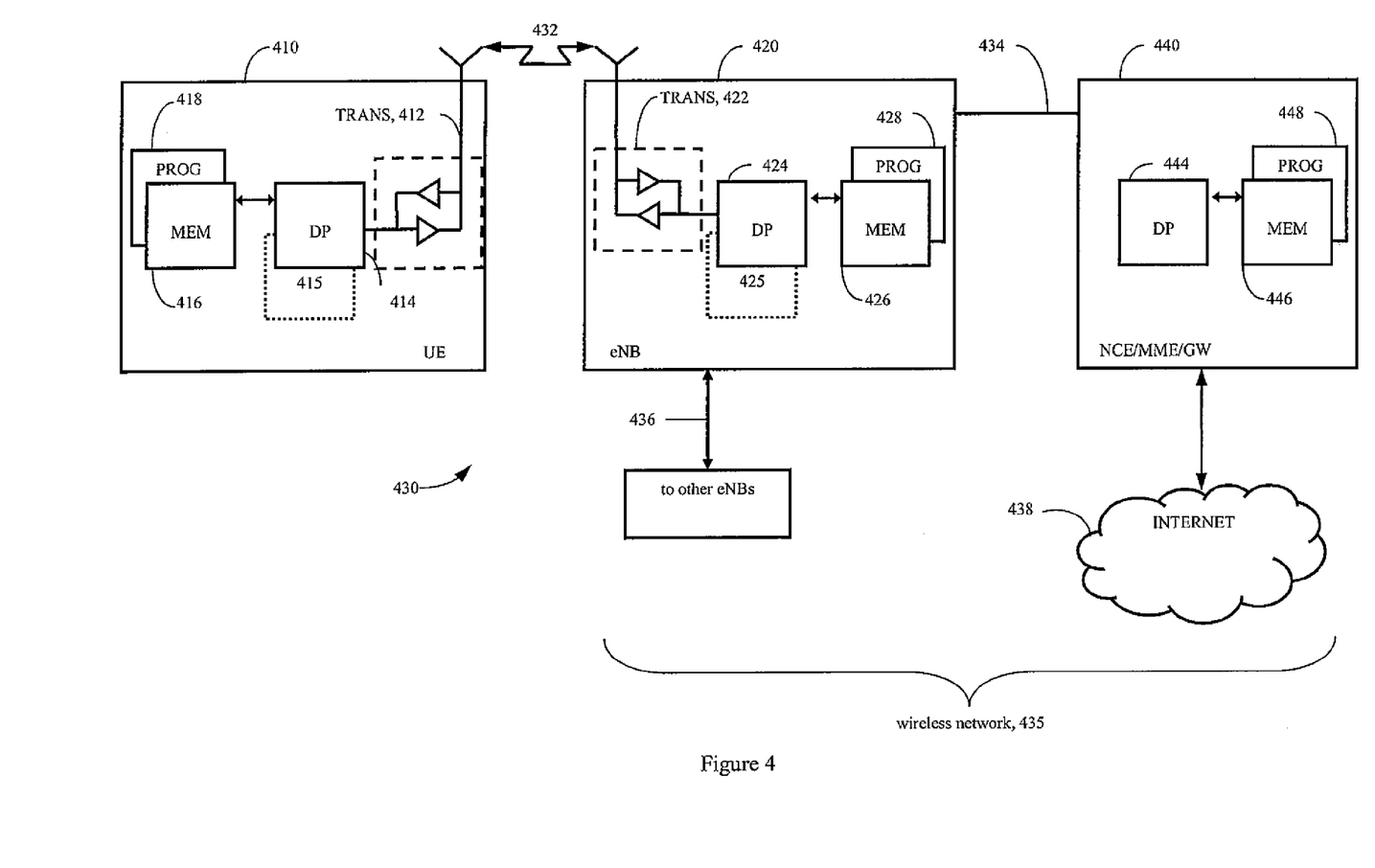
FIG. 4 shows a simplified block diagram of exemplary electronic devices that are suitable for use in practicing various exemplary embodiments.

Reference is made to FIG. 4 for illustrating a simplified block diagram of various electronic devices and apparatus that are suitable for use in practicing exemplary embodiments.

In the wireless system 430 of FIG. 4, a wireless network 435 is adapted for communication over a wireless link 432 with an apparatus, such as a mobile communication device which may be referred to as a UE 410, via a network access node, such as a Node B (base station), and more specifically an eNB 420. The network 435 may include a network control element (NCE) 440 that may include MME/SGW functionality shown, and which provides connectivity with a network, such as a telephone network and/or a data communications network (e.g., the internet 438).

The UE 410 includes a controller, such as a computer or a data processor (DP) 414, a computer-readable memory medium embodied as a memory (MEM) 416 that stores a program of computer instructions (PROG) 418, and a suitable wireless interface, such as radio frequency (RF) transceiver 412, for bidirectional wireless communications with the eNB 420 via one or more antennas.

The eNB 420 also includes a controller, such as a computer or a data processor (DP) 424, a computer-readable memory medium embodied as a memory (MEM) 426 that stores a program of computer instructions (PROG) 428, and a suitable wireless interface, such as RF transceiver 422, for communication with the UE 410 via one or more antennas. The eNB 420 is coupled via a data/control path 434 to the NCE 440. The path 434 may be implemented as an SI interface. The eNB 420 may also be coupled to another eNB via data/control path 436, which may be implemented as an X2 interface.

The NCE 440 includes a controller, such as a computer or a data processor (DP) 444, a computer-readable memory medium embodied as a memory (MEM) 446 that stores a program of computer instructions (PROG) 448.

At least one of the PROGs 418, 428 and 448 is assumed to include program instructions that, when executed by the associated DP, enable the device to operate in accordance with exemplary embodiments, as will be discussed below in greater detail.

That is, various exemplary embodiments may be implemented at least in part by computer software executable by the DP 414 of the UE 410; by the DP 424 of the eNB 420; and/or by the DP 444 of the NCE 440, or by hardware, or by a combination of software and hardware (and firmware).

The UE 410 and the eNB 420 may also include dedicated processors, for example DCI processor 415 and DCI processor 425.

In general, the various embodiments of the UE 410 can include, but are not limited to, cellular telephones, tablets having wireless communication capabilities, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 416, 426 and 446 may be of any type suitable to the local technical environment and may be implemented using any suitable data storage technology, such as semiconductor based memory devices, flash memory, magnetic memory devices and systems, optical memory devices and systems, fixed memory and removable memory. The DPs 414, 424 and 444 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 412 and 422) may be of any type suitable to the local technical environment and may be implemented using any suitable communication technology such as individual transmitters, receivers, transceivers or a combination of such components.

It should thus be appreciated that at least some aspects of the exemplary embodiments may be practiced in various components such as integrated circuit chips and modules, and that the exemplary embodiments may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments.

An exemplary embodiment provides a method for coverage enhancement. The method includes determining (such as by a processor) a DCI assignment for a communications device experiencing limited coverage. The communications device may be suffering pathloss to the serving cell greater than a certain threshold and/or have SINR/SNR below a certain threshold. A DCI assignment includes a plurality of configuration fields. Selecting (such as by a processor) an indication of the DCI assignment is included in the method. The indication of the DCI assignment is smaller than/uses fewer resources than the DCI assignment (such as where the indication of the DCI assignment has fewer bits than a DCI assignment having all fields for the associated DCI format). The method also includes sending (such as by a transmitter) the indication of the DCI assignment to the communications device.

In a further exemplary embodiment of the method above, the communications device is a MTC device.

In another exemplary embodiment of any one of the methods above, the communications device is located at a cell edge.

In a further exemplary embodiment of any one of the methods above, the indication of the DCI assignment omits at least one of the plurality of the configuration fields and the at least one of the plurality of the configuration fields is associated with a preconfigured configuration.

In another exemplary embodiment of any one of the methods above, the indication of the DCI assignment includes an index to a preconfigured DCI assignment in a plurality of preconfigured DCI assignments.

In a further exemplary embodiment of any one of the methods above, the indication of the DCI assignment includes a RNTI. The RNTI is associated with a preconfigured DCI assignment. The RNTI may be masked with an indication of whether the DCI assignment is either an UL scheduling assignment or a DL scheduling assignment.

In another exemplary embodiment of any one of the methods above, the method also includes selecting an identifier for the communications device. Determining the DCI assignment for the communications device is based at least in part on the identifier for the communications device. Selecting the identifier for the communications device may be based at least in part on a type of service provided to the communications device.

In a further exemplary embodiment of any one of the methods above, determining the DCI assignment for the communications device is based at least in part on a type of service provided to the communications device, a traffic pattern of the communications device, an application for the communications device and/or current traffic conditions.

In another exemplary embodiment of any one of the methods above, the DCI assignment includes a first CRC field having a first size. The indication of the DCI assignment includes a second CRC field having a second size and the second size is smaller than the first size.

In a further exemplary embodiment of any one of the methods above, the method also includes receiving a random access transmission from the communications device and selecting a DCI format for the DCI assignment based at least in part on the random access transmission.

In another exemplary embodiment of any one of the methods above, the indication of the DCI assignment indicates/comprises a physical control channel region extension.

In a further exemplary embodiment of any one of the methods above, the method also includes sending a plurality of preconfigured DCI assignments to the communications device. Sending the plurality of preconfigured DCI assignments may include sending the plurality of preconfigured DCI assignments using radio resource control signaling.

Another exemplary embodiment provides a method for coverage enhancement. The method includes receiving (such as by a receiver) an indication of a DCI assignment at a communications device. A DCI assignment includes a plurality of configuration fields and the indication of the DCI assignment is smaller than the DCI assignment. The method also includes determining (such as by a processor) the DCI assignment for the communications device based at least in part on the indication of the DCI assignment.

In a further exemplary embodiment of the method above, the method also includes receiving a plurality of preconfigured DCI assignments at the communications device. Receiving the plurality of preconfigured DCI assignments may include receiving the plurality of preconfigured DCI assignments via radio resource control signaling.

In another exemplary embodiment of any one of the methods above, the indication of the DCI assignment includes an index to a preconfigured DCI assignment in a plurality of preconfigured DCI assignments.

In a further exemplary embodiment of any one of the methods above, determining the DCI assignment includes, in response to the indication of the DCI assignment omitting at least one of the plurality of the configuration fields, determining a preconfigured configuration for the at least one of the plurality of the configuration fields.

In another exemplary embodiment of any one of the methods above, the indication of the DCI assignment includes a RNTI. The RNTI is associated with a preconfigured DCI assignment. The RNTI may be masked with an indication of whether the DCI assignment is one of: an UL assignment and a DL assignment.

In a further exemplary embodiment of any one of the methods above, determining the DCI assignment for the communications device is based at least in part on an identifier for the communications device.

In another exemplary embodiment of any one of the methods above, the identifier is based at least in part on a type of service provided to the communications device.

In a further exemplary embodiment of any one of the methods above, the DCI assignment includes a first CRC field having a first size. The indication of the DCI assignment includes a second CRC field having a second size and the second size is smaller than the first size.

In another exemplary embodiment of any one of the methods above, the method also includes sending a random access transmission from the communications device. Determining the DCI assignment for the communications device is based at least in part on the random access transmission.

In a further exemplary embodiment of any one of the methods above, the indication of the DCI assignment includes a physical control channel region extension.

Another exemplary embodiment provides an apparatus for coverage enhancement. The apparatus (such as eNB 420) includes at least one processor (such as DP 424) and at least one memory (such as MEM 426) storing computer program code (such as PROG 428). The at least one memory and the computer program code are configured to, with the at least one processor, cause the apparatus to perform actions. The actions include determining a DCI assignment for a communications device experiencing limited coverage. The communications device may be suffering pathloss to the serving cell greater than a certain threshold and/or have SINR/SNR below a certain threshold. A DCI assignment includes a plurality of configuration fields. Selecting an indication of the DCI assignment is included in the actions. The indication of the DCI assignment uses fewer resources than the DCI assignment (such as where the indication of the DCI assignment has fewer bits than a DCI assignment having all fields for the associated DCI format). The actions also include sending the indication of the DCI assignment to the communications device.

In a further exemplary embodiment of the apparatus above, the communications device is a MTC device.

In another exemplary embodiment of any one of the apparatus above, the communications device is located at a cell edge.

In a further exemplary embodiment of any one of the apparatus above, the indication of the DCI assignment omits at least one of the plurality of the configuration fields and the at least one of the plurality of the configuration fields is associated with a preconfigured configuration.

In another exemplary embodiment of any one of the apparatus above, the indication of the DCI assignment includes an index to a preconfigured DCI assignment in a plurality of preconfigured DCI assignments.

In a further exemplary embodiment of any one of the apparatus above, the indication of the DCI assignment includes a RNTI. The RNTI is associated with a preconfigured DCI assignment. The RNTI may be masked with an indication of whether the DCI assignment is either an UL scheduling assignment or a DL scheduling assignment.

In another exemplary embodiment of any one of the apparatus above, the actions also include selecting an identifier for the communications device. Determining the DCI assignment for the communications device is based at least in part on the identifier for the communications device. Selecting the identifier for the communications device may be based at least in part on a type of service provided to the communications device.

In a further exemplary embodiment of any one of the apparatus above, determining the DCI assignment for the communications device is based at least in part on a type of service provided to the communications device, a traffic pattern of the communications device, an application for the communications device and/or current traffic conditions.

In another exemplary embodiment of any one of the apparatus above, the DCI assignment includes a first CRC field having a first size. The indication of the DCI assignment includes a second CRC field having a second size and the second size is smaller than the first size.

In a further exemplary embodiment of any one of the apparatus above, the actions also include receiving a random access transmission from the communications device and selecting a DCI format for the DCI assignment based at least in part on the random access transmission.

In another exemplary embodiment of any one of the apparatus above, the indication of the DCI assignment indicates/comprises a physical control channel region extension.

In a further exemplary embodiment of any one of the apparatus above, the actions also include sending a plurality of preconfigured DCI assignments to the communications device. Sending the plurality of preconfigured DCI assignments may include sending the plurality of preconfigured DCI assignments using radio resource control signaling.

In another exemplary embodiment of any one of the apparatus above, the apparatus is embodied in a mobile device.

In a further exemplary embodiment of any one of the apparatus above, the apparatus is embodied in an integrated circuit.

Another exemplary embodiment provides an apparatus for coverage enhancement. The apparatus (such as UE 410) includes at least one processor (such as DP 414) and at least one memory (such as MEM 416) storing computer program code (such as PROG 418). The at least one memory and the computer program code are configured to, with the at least one processor, cause the apparatus to perform actions. The actions include receiving an indication of a DCI assignment at a communications device. A DCI assignment includes a plurality of configuration fields and the indication of the DCI assignment is smaller than the DCI assignment. The actions also include determining the DCI assignment for the communications device based at least in part on the indication of the DCI assignment.

In a further exemplary embodiment of the apparatus above, the actions also include receiving a plurality of preconfigured DCI assignments at the communications device. Receiving the plurality of preconfigured DCI assignments may include receiving the plurality of preconfigured DCI assignments via radio resource control signaling.

In another exemplary embodiment of any one of the apparatus above, the indication of the DCI assignment includes an index to a preconfigured DCI assignment in a plurality of preconfigured DCI assignments.

In a further exemplary embodiment of any one of the apparatus above, determining the DCI assignment includes, in response to the indication of the DCI assignment omitting at least one of the plurality of the configuration fields, determining a preconfigured configuration for the at least one of the plurality of the configuration fields.

In another exemplary embodiment of any one of the apparatus above, the indication of the DCI assignment includes a RNTI. The RNTI is associated with a preconfigured DCI assignment. The RNTI may be masked with an indication of whether the DCI assignment is one of: an UL assignment and a DL assignment.

In a further exemplary embodiment of any one of the apparatus above, determining the DCI assignment for the communications device is based at least in part on an identifier for the communications device.

In another exemplary embodiment of any one of the apparatus above, the identifier is based at least in part on a type of service provided to the communications device.

In a further exemplary embodiment of any one of the apparatus above, the DCI assignment includes a first CRC field having a first size. The indication of the DCI assignment includes a second CRC field having a second size and the second size is smaller than the first size.

In another exemplary embodiment of any one of the apparatus above, the actions also include sending a random access transmission from the communications device. Determining the DCI assignment for the communications device is based at least in part on the random access transmission.

In a further exemplary embodiment of any one of the apparatus above, the indication of the DCI assignment includes a physical control channel region extension.

In another exemplary embodiment of any one of the apparatus above, the apparatus is embodied in a mobile device.

In a further exemplary embodiment of any one of the apparatus above, the apparatus is embodied in an integrated circuit.

Another exemplary embodiment provides a computer readable medium for coverage enhancement. The computer readable medium (such as MEM 426) is tangibly encoded with a computer program (such as PROG 428) executable by a processor (such as DP 424) to perform actions. The actions include determining a DCI assignment for a communications device experiencing limited coverage. The communications device may be suffering pathloss to the serving cell greater than a certain threshold and/or have SINR/SNR below a certain threshold. A DCI assignment includes a plurality of configuration fields. Selecting an indication of the DCI assignment is included in the actions. The indication of the DCI assignment uses fewer resources than the DCI assignment (such as where the indication of the DCI assignment has fewer bits than a DCI assignment having all fields for the associated DCI format). The actions also include sending the indication of the DCI assignment to the communications device.

In a further exemplary embodiment of the computer readable medium above, the communications device is a MTC device.

In another exemplary embodiment of any one of the computer readable media above, the communications device is located at a cell edge.

In a further exemplary embodiment of any one of the computer readable media above, the indication of the DCI assignment omits at least one of the plurality of the configuration fields and the at least one of the plurality of the configuration fields is associated with a preconfigured configuration.

In another exemplary embodiment of any one of the computer readable media above, the indication of the DCI assignment includes an index to a preconfigured DCI assignment in a plurality of preconfigured DCI assignments.

In a further exemplary embodiment of any one of the computer readable media above, the indication of the DCI assignment includes a RNTI. The RNTI is associated with a preconfigured DCI assignment. The RNTI may be masked with an indication of whether the DCI assignment is either an UL scheduling assignment or a DL scheduling assignment.

In another exemplary embodiment of any one of the computer readable media above, the actions also include selecting an identifier for the communications device. Determining the DCI assignment for the communications device is based at least in part on the identifier for the communications device. Selecting the identifier for the communications device may be based at least in part on a type of service provided to the communications device.

In a further exemplary embodiment of any one of the computer readable media above, determining the DCI assignment for the communications device is based at least in part on a type of service provided to the communications device, a traffic pattern of the communications device, an application for the communications device and/or current traffic conditions.

In another exemplary embodiment of any one of the computer readable media above, the DCI assignment includes a first CRC field having a first size. The indication of the DCI assignment includes a second CRC field having a second size and the second size is smaller than the first size.

In a further exemplary embodiment of any one of the computer readable media above, the actions also include receiving a random access transmission from the communications device and selecting a DCI format for the DCI assignment based at least in part on the random access transmission.

In another exemplary embodiment of any one of the computer readable media above, the indication of the DCI assignment indicates/comprises a physical control channel region extension.

In a further exemplary embodiment of any one of the computer readable media above, the actions also include sending a plurality of preconfigured DCI assignments to the communications device. Sending the plurality of preconfigured DCI assignments may include sending the plurality of preconfigured DCI assignments using radio resource control signaling.

In another exemplary embodiment of any one of the computer readable media above, the computer readable medium is a non-transitory computer readable medium (e.g., CD-ROM, RAM, flash memory, etc.).

In a further exemplary embodiment of any one of the computer readable media above, the computer readable medium is a storage medium.

Another exemplary embodiment provides a computer readable medium for coverage enhancement. The computer readable medium (such as MEM 416) is tangibly encoded with a computer program (such as PROG 418) executable by a processor (such as DP 414) to perform actions. The actions include receiving an indication of a DCI assignment at a communications device. A DCI assignment includes a plurality of configuration fields and the indication of the DCI assignment is smaller than the DCI assignment. The actions also include determining the DCI assignment for the communications device based at least in part on the indication of the DCI assignment.

In a further exemplary embodiment of the computer readable medium above, the actions also include receiving a plurality of preconfigured DCI assignments at the communications device. Receiving the plurality of preconfigured DCI assignments may include receiving the plurality of preconfigured DCI assignments via radio resource control signaling.

In another exemplary embodiment of any one of the computer readable media above, the indication of the DCI assignment includes an index to a preconfigured DCI assignment in a plurality of preconfigured DCI assignments.

In a further exemplary embodiment of any one of the computer readable media above, determining the DCI assignment includes, in response to the indication of the DCI assignment omitting at least one of the plurality of the configuration fields, determining a preconfigured configuration for the at least one of the plurality of the configuration fields.

In another exemplary embodiment of any one of the computer readable media above, the indication of the DCI assignment includes a RNTI. The RNTI is associated with a preconfigured DCI assignment. The RNTI may be masked with an indication of whether the DCI assignment is one of: an UL assignment and a DL assignment.

In a further exemplary embodiment of any one of the computer readable media above, determining the DCI assignment for the communications device is based at least in part on an identifier for the communications device.

In another exemplary embodiment of any one of the computer readable media above, the identifier is based at least in part on a type of service provided to the communications device.

In a further exemplary embodiment of any one of the computer readable media above, the DCI assignment includes a first CRC field having a first size. The indication of the DCI assignment includes a second CRC field having a second size and the second size is smaller than the first size.

In another exemplary embodiment of any one of the computer readable media above, the actions also include sending a random access transmission from the communications device. Determining the DCI assignment for the communications device is based at least in part on the random access transmission.

In a further exemplary embodiment of any one of the computer readable media above, the indication of the DCI assignment includes a physical control channel region extension.

In another exemplary embodiment of any one of the computer readable media above, the computer readable medium is a non-transitory computer readable medium (e.g., CD-ROM, RAM, flash memory, etc.).

In a further exemplary embodiment of any one of the computer readable media above, the computer readable medium is a storage medium.

Another exemplary embodiment provides an apparatus for coverage enhancement. The apparatus includes means for determining (such as a processor) a DCI assignment for a communications device experiencing limited coverage. The communications device may be suffering pathloss to the serving cell greater than a certain threshold and/or have SINR/SNR below a certain threshold. A DCI assignment includes a plurality of configuration fields. Means for selecting (such as a processor) an indication of the DCI assignment is included in the apparatus. The indication of the DCI assignment uses fewer resources than the DCI assignment (such as where the indication of the DCI assignment has fewer bits than a DCI assignment having all fields for the associated DCI format). The apparatus also includes means for sending (such as a transmitter) the indication of the DCI assignment to the communications device.

In a further exemplary embodiment of the apparatus above, the communications device is a MTC device.

In another exemplary embodiment of any one of the apparatus above, the communications device is located at a cell edge.

In a further exemplary embodiment of any one of the apparatus above, the indication of the DCI assignment omits at least one of the plurality of the configuration fields and the at least one of the plurality of the configuration fields is associated with a preconfigured configuration.

In another exemplary embodiment of any one of the apparatus above, the indication of the DCI assignment includes an index to a preconfigured DCI assignment in a plurality of preconfigured DCI assignments.

In a further exemplary embodiment of any one of the apparatus above, the indication of the DCI assignment includes a RNTI. The RNTI is associated with a preconfigured DCI assignment. The RNTI may be masked with an indication of whether the DCI assignment is either an UL scheduling assignment or a DL scheduling assignment.

In another exemplary embodiment of any one of the apparatus above, the apparatus also includes means for selecting an identifier for the communications device. Determining the DCI assignment for the communications device is based at least in part on the identifier for the communications device. Selecting the identifier for the communications device may be based at least in part on a type of service provided to the communications device.

In a further exemplary embodiment of any one of the apparatus above, determining the DCI assignment for the communications device is based at least in part on a type of service provided to the communications device, a traffic pattern of the communications device, an application for the communications device and/or current traffic conditions.

In another exemplary embodiment of any one of the apparatus above, the DCI assignment includes a first CRC field having a first size. The indication of the DCI assignment includes a second CRC field having a second size and the second size is smaller than the first size.

In a further exemplary embodiment of any one of the apparatus above, the apparatus also includes means for receiving a random access transmission from the communications device and selecting a DCI format for the DCI assignment based at least in part on the random access transmission.

In another exemplary embodiment of any one of the apparatus above, the indication of the DCI assignment indicates/comprises a physical control channel region extension.

In a further exemplary embodiment of any one of the apparatus above, the apparatus also includes means for sending a plurality of preconfigured DCI assignments to the communications device. Sending the plurality of preconfigured DCI assignments may include means for sending the plurality of preconfigured DCI assignments using radio resource control signaling.

Another exemplary embodiment provides an apparatus for coverage enhancement. The apparatus includes means for receiving (such as a receiver) an indication of a DCI assignment at a communications device. A DCI assignment includes a plurality of configuration fields and the indication of the DCI assignment is smaller than the DCI assignment. The apparatus also includes means for determining (such as a processor) the DCI assignment for the communications device based at least in part on the indication of the DCI assignment.

In a further exemplary embodiment of the apparatus above, the apparatus also includes means for receiving a plurality of preconfigured DCI assignments at the communications device. The plurality of preconfigured DCI assignments receiving means may include means for receiving the plurality of preconfigured DCI assignments via radio resource control signaling.

In another exemplary embodiment of any one of the apparatus above, the indication of the DCI assignment includes an index to a preconfigured DCI assignment in a plurality of preconfigured DCI assignments.

In a further exemplary embodiment of any one of the apparatus above, the DCI assignment determining means includes means for determining a preconfigured configuration for the at least one of the plurality of the configuration fields in response to the indication of the DCI assignment omitting at least one of the plurality of the configuration fields.

In another exemplary embodiment of any one of the apparatus above, the indication of the DCI assignment includes a RNTI. The RNTI is associated with a preconfigured DCI assignment. The RNTI may be masked with an indication of whether the DCI assignment is one of: an UL assignment and a DL assignment.

In a further exemplary embodiment of any one of the apparatus above, determining the DCI assignment for the communications device is based at least in part on an identifier for the communications device.

In another exemplary embodiment of any one of the apparatus above, the identifier is based at least in part on a type of service provided to the communications device.

In a further exemplary embodiment of any one of the apparatus above, the DCI assignment includes a first CRC field having a first size. The indication of the DCI assignment includes a second CRC field having a second size and the second size is smaller than the first size.

In another exemplary embodiment of any one of the apparatus above, the apparatus also includes means for sending a random access transmission from the communications device. Determining the DCI assignment for the communications device is based at least in part on the random access transmission.

In a further exemplary embodiment of any one of the apparatus above, the indication of the DCI assignment includes a physical control channel region extension.

Various modifications and adaptations to the foregoing exemplary embodiments may become apparent to those skilled in the relevant arts in view of the foregoing description, when read in conjunction with the accompanying drawings. However, any and all modifications will still fall within the scope of the non-limiting and exemplary embodiments.

For example, while the exemplary embodiments have been described above in the context of the E-UTRAN (UTRAN-LTE) system, it should be appreciated that the exemplary embodiments are not limited for use with only this one particular type of wireless communication system, and that they may be used to advantage in other wireless communication systems such as for example (WLAN, UTRAN, GSM as appropriate).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names assigned to different channels (e.g., PDSCH, PUSCH, etc.) are not intended to be limiting in any respect, as these various channels may be identified by any suitable names.

Furthermore, some of the features of the various non-limiting and exemplary embodiments may be used to advantage without the corresponding use of other features. As such, the foregoing description should be considered as merely illustrative of the principles, teachings and exemplary embodiments, and not in limitation thereof.

The following abbreviations that may be found in the specification and/or the drawing figures are defined as follows:

3GPP third generation partnership project
BW bandwidth
CCE control channel element
CRC cyclic redundancy check
C-RNTI cell RNTI
DCI downlink control information
DL downlink (eNB towards UE)
eNB E-UTRAN Node B (evolved Node B)
EPDCCH enhanced physical downlink control channel
E-UTRAN evolved UTRAN (LTE)
FDD frequency division duplex
FDMA frequency division multiple access
FDPS frequency domain packet scheduler
HARQ hybrid automatic repeat request
ID identifier
IMT-A international mobile telephony-advanced
ITU international telecommunication union
ITU-R ITU radiocommunication sector
LTE long term evolution of UTRAN (E-UTRAN)
MAC medium access control (layer 2, L2)
MCS modulation and coding selection
MTC machine type communications
MU-MIMO multi-user multi-input multi-output
NDI new data indicator
Node B base station
PDCCH physical downlink control channel
PDSCH physical downlink shared channel
PRACH physical random access channel
PRB physical resource block
PUCSH physical uplink shared channel
RB resource block
RNTI radio network temporary identifier
RRC radio resource control
RV redundancy version
SN sequence number
SNR signal-to-noise ratio
SPS semi-persistent scheduling
SRS sounding reference signal
TBS transport block size
TDD time division duplex
TTI transmission time interval
UE user equipment, such as a mobile station or mobile terminal
UL uplink (UE towards eNB)
UTRAN universal terrestrial radio access network

What is claimed is:

1. An apparatus, comprising:
at least one processor; and
at least one memory including computer program code, the at least one memory and the computer program code configured to, with the at least one processor, cause the apparatus to at least:
receive an indication of a downlink control information assignment at a communications device, where the downlink control information assignment comprises a plurality of configuration fields;
determine the downlink control information assignment for the communications device based at least in part on the indication of the downlink control information assignment and a random access transmission sent from the communications device; and
receive a scheduling assignment at the communications device based on at least the determined downlink control information assignment, wherein
a downlink control information format associated with the downlink control information assignment is based at least in part on a length of a transmission time for the random access transmission.

2. The apparatus of claim 1, where the at least one memory and the computer program code are further configured to cause the apparatus to receive a plurality of preconfigured downlink control information assignments at the communications device.

3. The apparatus of claim 2, where, when receiving the plurality of preconfigured downlink control information assignments, the at least one memory and the computer program code are further configured to cause the apparatus to receive the plurality of preconfigured downlink control information assignments via radio resource control signaling.

4. The apparatus of claim 1, the indication of the downlink control information assignment comprises an index to a preconfigured downlink control information assignment in a plurality of preconfigured downlink control information assignments.

5. The apparatus of claim 1, where, when determining the downlink control information assignment, the at least one memory and the computer program code are further configured to cause the apparatus, in response to the indication of the downlink control information assignment omitting at least one of the plurality of the configuration fields, to determine a preconfigured configuration for the at least one of the plurality of the configuration fields.

6. The apparatus of claim 1, where the indication of the downlink control information assignment comprises a radio network temporary identifier, where the radio network temporary identifier is associated with a preconfigured downlink control information assignment.

7. The apparatus of claim 6, where the radio network temporary identifier is masked with an indication of whether the downlink control information assignment is one of an uplink assignment and a downlink assignment.

8. The apparatus of claim 1, where determining the downlink control information assignment for the communications device is based at least in part on an identifier for the communications device.

9. The apparatus of claim 1, where the identifier is based at least in part on a type of service provided to the communications device.

10. The apparatus of claim 1, where the downlink control information assignment comprises a first cyclic redundancy check field having a first size, where the indication of the downlink control information assignment comprises a second cyclic redundancy check field having a second size and where the second size is smaller than the first size.

11. The apparatus of claim 1, where the indication of the downlink control information assignment comprises a physical control channel region extension.

12. An apparatus, comprising
at least one processor; and
at least one memory including computer program code, the at least one memory and the computer program code configured to, with the at least one processor, cause the apparatus to at least:
determine a downlink control information assignment for a communications device experiencing limited coverage, where the downlink control information assignment is determined based in part on at least a random access transmission sent from the communications device, and where the downlink control information assignment comprises a plurality of configuration fields;
determine an indication of the downlink control information assignment; and
send the indication of the downlink control information assignment to the communications device wherein the downlink control information assignment indicates a scheduling assignment to the communications device and a downlink control information format associated with the downlink control information assignment is based at least in part on a length of a transmission time for the random access transmission.

13. The apparatus of claim 12, where the communications device is a machine type communications device.

14. The apparatus of claim 12, where the communications device is at least one of: suffering pathloss to the serving cell greater than a certain pathloss threshold and has a signal to noise ratio below a certain ratio threshold.

15. The apparatus of claim 12, where the at least one memory and the computer program code are further configured to cause the apparatus to select an identifier for the communications device based at least in part on a type of service provided to the communications device, where determining the downlink control information assignment for the communications device is based at least in part on the identifier for the communications device.

16. The apparatus of claim 12, where determining the downlink control information assignment for the communications device is based at least in part on at least one of: a type of service provided to the communications device, a traffic pattern of the communications device, an application for the communications device and current traffic conditions.

17. The apparatus of claim 12, where the at least one memory and the computer program code are further configured to cause the apparatus to send a plurality of preconfigured downlink control information assignments to the communications device.

18. The apparatus of claim 17, where, when sending the plurality of preconfigured downlink control information assignments, the at least one memory and the computer program code are further configured to cause the apparatus to send the plurality of preconfigured downlink control information assignments using radio resource control signaling.

19. A method comprising:
receiving an indication of a downlink control information assignment at a communications device, where the downlink control information assignment comprises a plurality of configuration fields;
determining the downlink control information assignment for the communications device based at least in part on the indication of the downlink control information assignment and a random access transmission sent from the communications device; and
receiving a scheduling assignment at the communications device based on at least the determined downlink control information assignment, wherein
a downlink control information format associated with the downlink control information assignment is based at least in part on a length of a transmission time for said random access transmission.

20. The method of claim 19, further comprising: receiving a plurality of preconfigured downlink control information assignments at the communications device.

* * * * *